United States Patent [19]

Kurihara et al.

[11] 4,446,727

[45] May 8, 1984

[54] METHOD FOR INTEGRATING FUEL CONSUMPTION AMOUNT OF VEHICLES

[75] Inventors: Norimitsu Kurihara, Saitama; Takeshi Imai, Tokyo, both of Japan

[73] Assignee: Honda Giken Kogyo Kabushiki Kaisha, Tokyo, Japan

[21] Appl. No.: 403,002

[22] Filed: Jul. 29, 1982

[30] Foreign Application Priority Data

Jul. 31, 1981 [JP] Japan .............................. 56-120242

[51] Int. Cl.³ .............................................. G01F 9/02
[52] U.S. Cl. .................................... 73/113; 73/861.81
[58] Field of Search ................ 73/861.81, 114, 3, 113; 364/431.03, 442

[56] References Cited

U.S. PATENT DOCUMENTS 4,050,295  9/1977  Harvey ................................... 73/114
4,182,175  1/1980  Boehringer ....................... 73/861.81

Primary Examiner—Jerry W. Myracle
Attorney, Agent, or Firm—Irving M. Weiner; Pamela S. Burt; John L. Shortley

[57] ABSTRACT

In a vehicle provided with a turbine-type fuel flow meter for detecting the flow rate of fuel supplied to a carburetor of an internal combustion engine, a method for integrating the amount of fuel consumption which comprises the steps of summing the flow rate detected by the fuel flow meter at each prescribed time, comparing a quantity relating to the vehicle speed in a mean value at the prescribed time with a given reference value, selecting one from at least two prescribed correction factors based on the comparison and correcting the corresponding sum value of fuel flow rate by multiplying by the selected factor, and integrating the corrected value of fuel flow rate. With such method, error based on the moment of inertia in a runner of the fuel flow meter is substantially eliminated.

7 Claims, 6 Drawing Figures

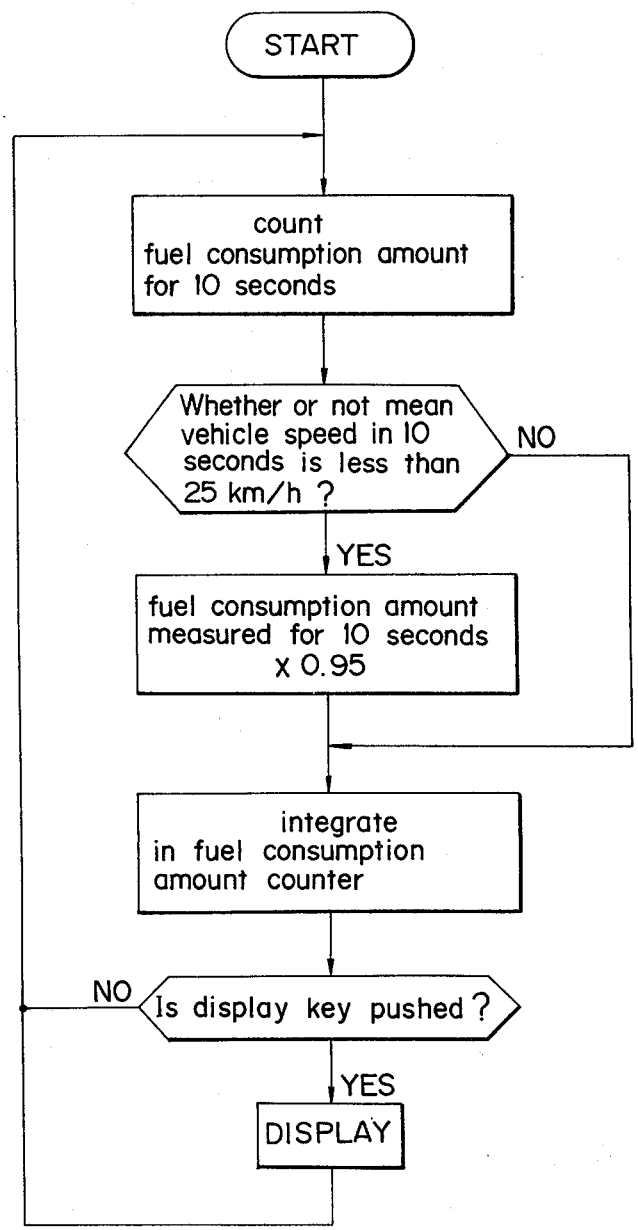

METHOD FOR INTEGRATING FUEL CONSUMPTION AMOUNT OF VEHICLES

BACKGROUND OF THE INVENTION

1. Field of the Invention

The present invention relates generally to a method for integrating the amount of fuel consumption of vehicles. More particularly, the invention relates to an integrating method in a vehicle provided with a turbine-type fuel flow meter which detects the flow rate of fuel supplied to a carburetor of an internal combustion engine, wherein the flow rate detected in the flow meter is integrated to thereby determine the amount of fuel consumption.

2. Description of Relevant Art

In a vehicle provided with a turbine-type fuel flow meter for detecting the flow rate of fuel supplied to a carburetor of an internal combustion engine, a conventional method of integrating the amount of fuel consumption is well known wherein the flow rate detected in the fuel flow meter is integrated to thereby determine the amount of fuel consumption.

In such a conventional method for integrating the amount of fuel consumption of vehicles, when a runner of the fuel flow meter is transferred from a relatively large angular velocity to a small angular velocity, the runner is in a state of excess rotation due to the moment of inertia, and thus the signal detected by the flow meter includes an overshoot error. The signal including such error is integrated, and a resultant problem arises in that the difference between the actual fuel consumption amount and the integrated value progressively increases.

The present invention effectively overcomes such problem attendant the conventional method for integrating the amount of fuel consumption of vehicles.

SUMMARY OF THE INVENTION

The present invention provides a method for integrating the amount of fuel consumption in a vehicle provided with an internal combustion engine, a carburetor for supplying fuel to the internal combustion engine, and a turbine-type fuel flow meter for detecting the flow rate of fuel supplied to the carburetor. The method comprises the steps of summing the fuel flow detected by the fuel flow meter at each prescribed time, comparing a quantity relating to the vehicle speed in a mean value at the prescribed time with a given reference value, selecting one from at least two prescribed correction factors based on the comparison and correcting the corresponding sum value of fuel flow by multiplying by the factor, and integrating the corrected values of fuel flow.

It is an object of the present invention to provide a method for integrating the amount of fuel consumption in a vehicle provided with a turbine-type fuel flow meter which detects the flow rate of fuel supplied to a carburetor of an internal combustion engine, wherein the fuel flow detected by the fuel flow meter is integrated to thereby determine the amount of fuel consumption, with the error based on the moment of inertia of a runner in the fuel flow meter being substantially eliminated.

The above and further objects, details and advantages of the present invention will become apparent from the following detailed description, when read in conjunction with the accompanying drawings.

BRIEF DESCRIPTION OF THE DRAWINGS

FIG. 6 is a sequence chart illustrating the integration procedure in the central processing unit of the integrating system shown in FIG. 5.

DETAILED DESCRIPTION OF PREFERRED EMBODIMENTS

Figure 1:
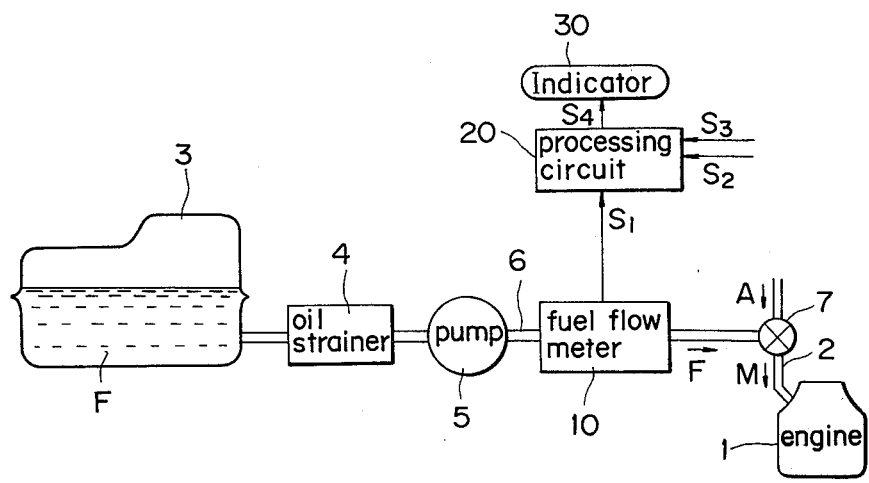
FIG. 1 is a flow chart of a fuel supply system and fuel consumption amount integrating system of a vehicle to which a method of integrating the amount of fuel consumption in accordance with the present invention is applied.

With reference to FIG. 1, there is shown an internal combustion engine 1 of a vehicle which in the operating state thereof is supplied with a mixture M of air A and fuel F through an intake pipe 2. The engine 1 obtains power required for driving the vehicle by using the mixture M in combustion.

The fuel F is stored in a fuel tank 3 and is fed therefrom through an oil strainer 4, a service pump 5, a fuel flow passage 6 and a carburetor 7 provided at the downstream end of the flow passage 6, into the intake pipe 2.

A fuel flow meter 10 is installed in the fuel flow passage 6 at the downstream side of the pump 5, and normally detects the flow rate of the fuel F and provides an electric pulse signal $S_1$ corresponding to the detected value. The signal $S_1$ is entered in a processing circuit 20 which receives an electric pulse signal $S_2$ including information relating to the vehicle speed from the exterior. The signal $S_1$ is corrected in the processing circuit 20 corresponding to the signal $S_2$ and is then integrated and stored therein. The fuel flow integration value stored in processing circuit 20 can be called up at any time by entering an external signal $S_3$ by manual operation, and is outputted as display signal $S_4$ and displayed by an indicator 30.

Figure 2:
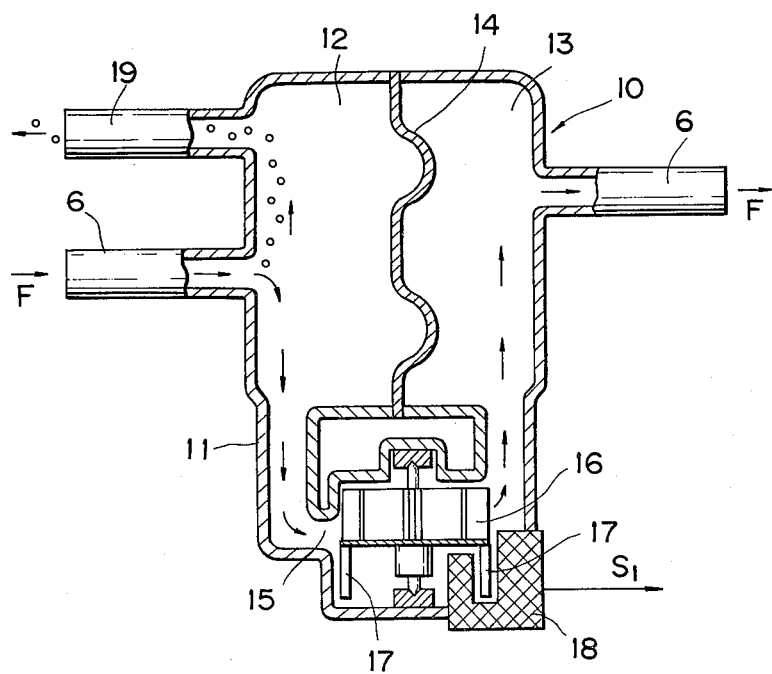
FIG. 2 is a vertical sectional view of a turbine-type fuel flow meter of the fuel supply system shown in FIG. 1.
Figure 3:
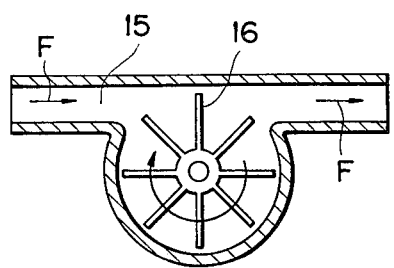
FIG. 3 is an enlarged transverse sectional view of a runner of the fuel flow meter shown in FIG. 2.

With reference to FIGS. 2 and 3, the fuel flow meter 10 comprises an upstream side oil chamber 12 and a downstream side oil chamber 13, the two chambers being partitioned from each other by a diaphragm 14; a communicating passage 15 which connects between the oil chambers 12, 13; and a housing 11 which defines the chambers and passage. The communicating passage 15 is provided with a runner 16 which rotates in response to the flow amount of the fuel F. The fuel flow meter 10 further comprises a plurality of light-shielding plates 17 which are arranged at regular intervals and can be integrally rotated with the runner 16, and a light projecting and receiving unit 18 arranged to sandwich the rotation track of the light shielding plates 17. The unit 18 in its light receiving state provides the electric signal $S_1$ by employing a photosensitive element (not shown) which is incorporated therein. Reference numeral 19 in FIG. 2 designates a vapor port connected to the fuel tank 3 through a return passage (not shown).

Figure 4:
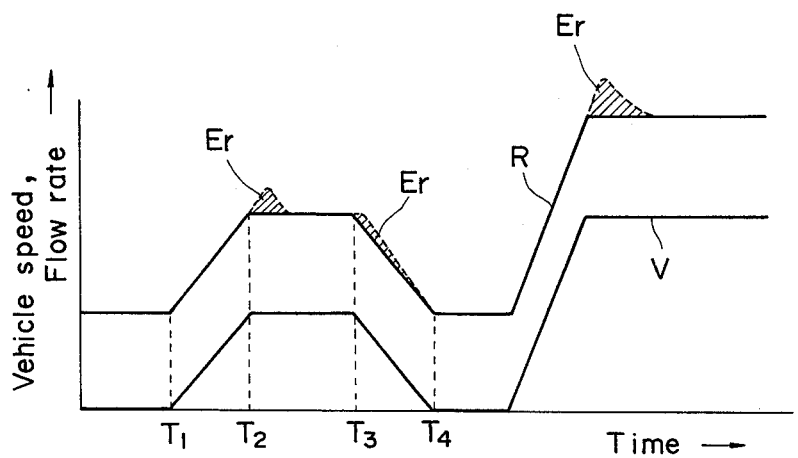
FIG. 4 is a graph illustrating the relationship between vehicle speed and fuel flow rate in FIG. 1.

With reference to the graph shown in FIG. 4, the abscissa represents time and the ordinate represents the vehicle speed as shown by the broken line V and the flow rate of the fuel F in the flow passage 6 as shown by broken line R. As shown in FIG. 4, the vehicle speed and the fuel flow rate are normally in close correlation. From a practical point of view, both are substantially in linear relation at a lower grade. For example, if the vehicle speed is accelerated from time $T_1$ to time $T_2$ and made constant from time $T_2$ to time $T_3$, and then decelerated from time $T_3$ to time $T_4$, the actual flow rate of the fuel F increases proportionately from $T_1$ to $T_2$ and becomes constant from $T_2$ to $T_3$ and then decreases proportionately from $T_3$ to $T_4$. However, if the runner 16 which is rotated by the flow of fuel F is transferred from a relatively large angular velocity to a smaller angular velocity, it cannot accurately follow the variation in the actual flow rate of the fuel F due to the moment of inertia, and is in a state of excess rotation which causes the output signal $S_1$ of the unit 18 to provide information including an overshoot error Er. The processing circuit 20 corrects the error Er in the manner described hereinbelow.

Figure 5:
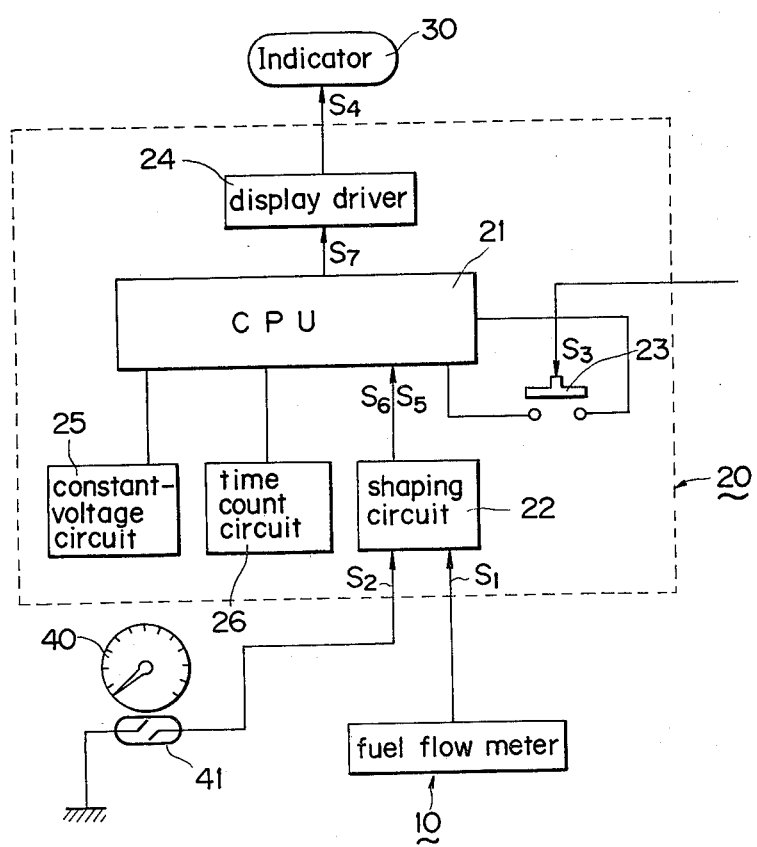
FIG. 5 is a block diagram of the fuel consumption amount integrating system shown in FIG. 1.

With reference to FIGS. 5 and 6, the processing circuit 20 has a central processing unit 21 (hereinafter referred to as "CPU") in which the display sequence of the fuel consumption amount shown in FIG. 6 is programmed. Signal $S_1$ from the fuel flow meter 10 and signal $S_2$ from a vehicle speed pulser 41 attached to a vehicle speedometer 40 are shaped in a wave-shaping circuit 22, and a fuel flow signal $S_5$ and vehicle speed signal $S_6$ which are obtained in the shaping circuit 22 are entered in the CPU 21 so that the signals $S_5$ and $S_6$ can be distinguished from each other. The CPU 21 counts the apparent fuel consumption amount based on the fuel flow signal $S_5$ substantially every 10 seconds, and determines whether the mean vehicle speed in 10 seconds based on the vehicle speed signal $S_6$ is less than substantially 25 kilometers per hour (km/h). If the mean vehicle speed is 25 km/h or less, the counted value of fuel consumption amount is multiplied by a correction factor of 0.95; and if the mean vehicle speed is greater than 25 km/h, the counted value is multiplied by a correction factor of 1, i.e., it is not changed. The corrected value of the amount of fuel consumption is then integrated and stored.

When a display key 23 is turned on by the external signal $S_3$ based on the switching operation of an operator, the CPU 21 supplies a display driver 24 with signal $S_7$ relating to the aforesaid integrated value. The display driver 24 outputs the display signal $S_4$ to an indicator 30 and the amount of fuel consumption is displayed on the indicator 30. When the external signal $S_3$ is not entered, the CPU 21 stores the final integrated value internally for at least 10 seconds of the counter interval. Reference numerals 25 and 26 in FIG. 5 designate a constant-voltage circuit and a time count circuit, respectively.

In the above-described arrangement, the count interval of the amount of fuel consumption, the method of setting correction criteria and the values of the correction factor may be changed depending on the type of vehicle, specification of the fuel flow meter 10, grade of the indicator 30, etc. Particularly, any decision for executing the correction may be effected if information relating to the vehicle speed is compared with at least one reference value which is previously set, for example, whether the detected value of the fuel flow meter 10 is less than a prescribed value or whether rotation of the runner 16 of the fuel flow meter 10 is decreasing.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. In a vehicle provided with an internal combustion engine, a carburetor which supplies fuel to said internal combustion engine, and a turbine-type fuel flow meter which detects the flow rate of fuel supplied to said carburetor, a method for integrating the amount of fuel consumption, comprising the steps of:
   summing the flow rate detected by said fuel flow meter at each prescribed time;
   comparing a quantity relating to the vehicle speed in a mean value at said prescribed time with a given reference value;
   selecting one from at least two prescribed correction factors based on the comparison and correcting the corresponding sum value of fuel flow rate by multiplying by the selected factor; and
   integrating the corrected value of fuel flow rate.

2. A method for integrating fuel consumption amount according to claim 1, wherein:
   said comparing step comprises the step of detecting the vehicle speed from a vehicle speedometer to thereby obtain said quantity.

3. A method for integrating fuel consumption amount according to claim 2, wherein:
   said reference value comprises a vehicle speed of substantially 25 km/h.

4. A method for integrating fuel consumption amount according to claim 3, wherein:
   said prescribed time is substantially 10 seconds.

5. A method for integrating fuel consumption amount according to claim 4, wherein:
   said factors in said selecting step include a first correction factor of substantially 0.90–0.95 and a second correction factor substantially equal to 1; and
   said selecting step comprises the step of selecting said first correction factor when the mean value is the reference vehicle speed or less and selecting said second correction factor when the mean value is greater than the reference vehicle speed.

6. A method for integrating fuel consumption amount according to claim 1, wherein:
   said comparing step comprises the step of assigning the detected flow rate to said quantity.

7. A method for integrating fuel consumption amount according to claim 1, wherein:
   said fuel flow meter is provided with a runner which rotates in response to flow amount of the fuel; and
   said comparing step comprises the step of detecting the speed of rotation of said runner to thereby obtain said quantity.

* * * * *